United States Patent [19]
Lee et al.

[11] Patent Number: 5,221,826
[45] Date of Patent: Jun. 22, 1993

[54] MIG WELDING TORCH RECONDITIONING APPARATUS

[76] Inventors: John R. Lee, R.R. #5, Strathroy, Ontario, Canada, N7G 3H6; Alfred R. Simond, 130 Prince Street, P.O. Box 583, Mount Brydges, Ontario, Canada, N0L 1W0

[21] Appl. No.: 844,059

[22] Filed: Mar. 2, 1992

[30] Foreign Application Priority Data

Mar. 4, 1991 [CA] Canada .................................. 2037489

[51] Int. Cl.$^5$ .............................................. B23K 9/32
[52] U.S. Cl. ...................................... 219/136; 15/93.1
[58] Field of Search ................ 219/137.43, 136, 137.2; 15/93.1

[56] References Cited

U.S. PATENT DOCUMENTS 4,583,257  4/1986  Bridges et al. ........................ 15/93.1
4,702,195 10/1987  Thielmann ............................ 15/93.1

*Primary Examiner*—Clifford C. Shaw

[57] ABSTRACT

A MIG welding torch reconditioning apparatus comprises a chuck adapted to receive such a torch in releasably clamped relation between ones of a plurality of selectively moveable cooperative jaws of respective clamps. The jaws are arranged in radially spaced relation around a central axis defining a longitudinal path of insertion for the torch. The clamps is movable to translationally reposition the jaws between: a clamping position in which said jaws are clampingly extended into interfering relation in said path; and, a retracted position wherein said jaws are positioned out of clamping relation, and clear of said path. The apparatus further comprises torch reconditioning tooling arranged in axial register along the common axis. The torch reconditioning tooling is selectively movable relative to the chuck along a longitudinal extent of that axis, to be thereby selectively removably positionable within a clamped torche's interior. In this orientation the tooling is operable to remove at least some of any backsplash deposits laid down on torch surfaces during the course of the torch's normal use.

15 Claims, 8 Drawing Sheets

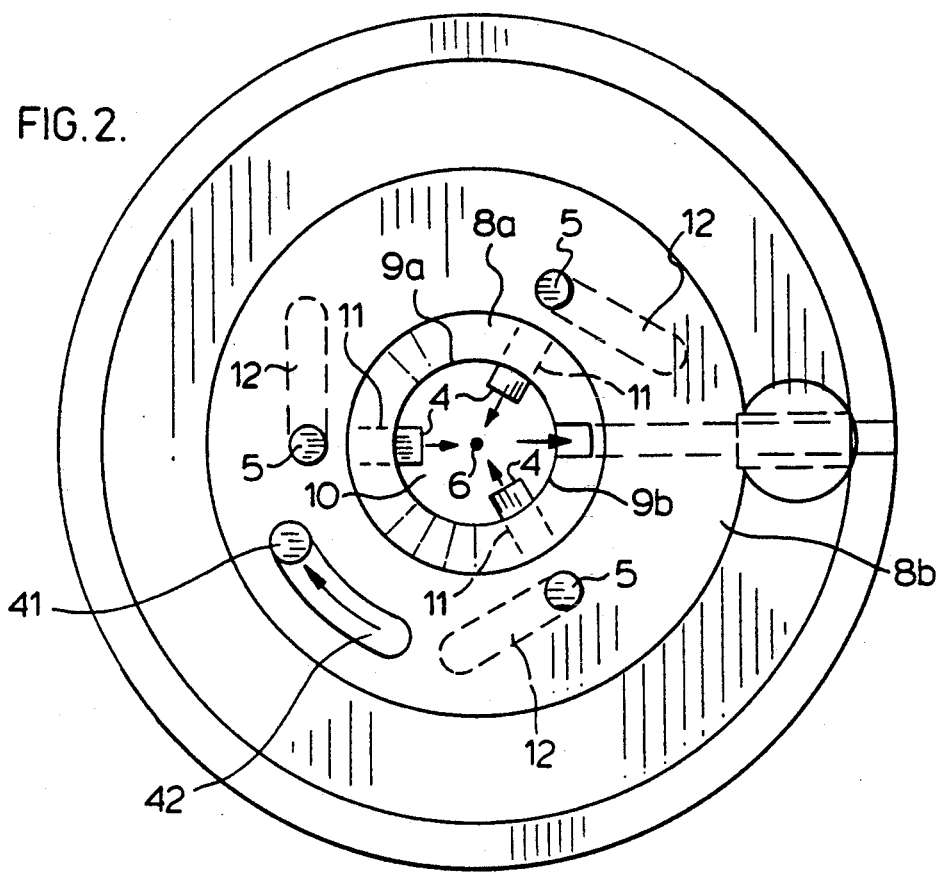
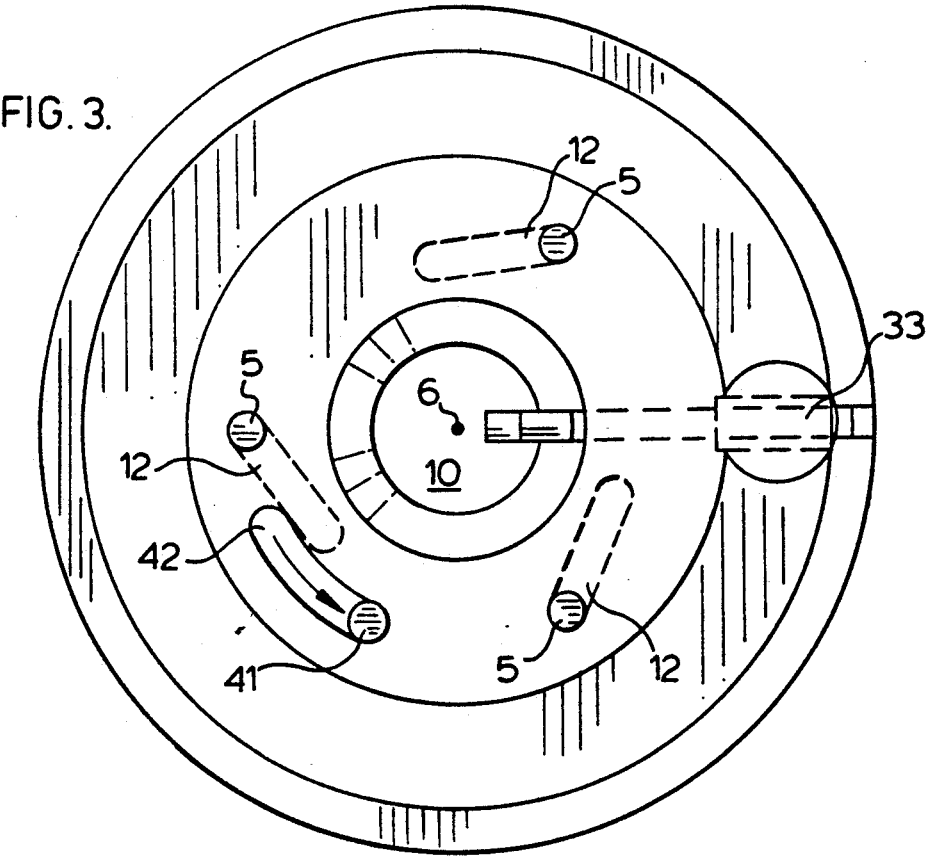

MIG WELDING TORCH RECONDITIONING APPARATUS

FIELD OF THE INVENTION

The present invention relates to MIG welding tip reconditioning apparatus, and especially to improvements therein useful in robotic MIG welding operations.

BACKGROUND OF THE INVENTION

For the present purposes, "welding" can fairly be said to embrace the fusing together of, in particular, two or more metal parts. Welded joints often exhibit greater rigidity than bolted or riveted constructions, and good quality welds are nonporous and leak-proof. In point of fact, good quality welds approximate the level of strength of the parent materials. Weld strengths are only slightly reduced below those levels as a consequence of unfavourable heat stresses that are set up in the immediate vicinity of the weld during the welding process. The potential advantages of welding in manufacturing processes include reduced capital investment requirements, greater flexibility of design, quicker change over to new or alternate designs, reduced machining and cleaning of parts, and improved strength to weight ratios in the assemble product.

The realization of any one or more of these associated advantages is, of course, contingent on the quality of the weld in question. There are a number of factors which impact on the character and quality of the weld, including the selection of any given welding technology, the competency of the operator, and of particular importance in the present context, the condition of the welding equipment.

A commonly used welding technique involves resistance welding. At least two welding electrodes are arranged in mutually opposed relation along a common axis, along which they are relatively movable. The two or more work pieces that are sought to be welded ar interposed between the two electrodes while they are arranged in axially spaced relation from one another. When the workpieces are properly mutually aligned there between, the electrodes are moved towards one another, and embrace the workpieces in forcibly clamped relation, whereupon an electric current is passed between the electrodes and the heat generated by the electrical resistance of the interposed workpieces results in localized melting of the workpieces proximal to the contacting electrode surfaces. The melted materials from the two or more clamped workpieces fuses together and the intermingled materials harden into a unified piece once the electrical current is discontinued. This welding technology utilizes large, physically robust electrodes in order to provide the prerequisite clamping strength. Typical electrodes used in industrial applications may be one half inch in diameter, or more.

The quality of the weld is to some degree, contingent on the condition of the mating surfaces of the electrodes. It was with this in mind that a variety of devices were produced, which were intended to recondition the electrodes. Such a treatment is necessary since the surfaces of the electrodes degrade quite quickly over the course of normal use. Examples of surface reconditioning apparatus for use in treating resistance welding electrodes are disclosed in the following patents: U.S. Pat. Nos. 4,682,487; 4,856,949; 4,916,931; and 4,921,377.

ARC welding is another well known welding technique. This differs fundamentally from resistance welding in that ARC welding electrodes are deliberately consumed during the welding process, and thereby come to form an integral component of the welded product. Accordingly, the problem of electrode reconditioning that arises in association with resistance welding, does not arise in ARC welding practices.

MIG (metal-inert-gas arc) welding is such an ARC welding process. More particularly, it is a process in which the electrode, in the form of a relatively fine wire, is continuously fed from a large spool driven by a variable speed welding drive. The speed at which the wire electrode is delivered to the weld is controlled in order to optimize arc length and burnoff rate during the welding process.

The electrical arc is enveloped in a moving gas flow, usually argon or other inert gas, or mixtures thereof. In an especially preferred form, MIG welding utilizes carbon dioxide as a shielding gas.

In MIG welding generally, both the wire electrode and the gas are channelled through a so-called "torch", which includes a central, electrically charged "tip". The tip directs the wire electrode toward the weld site, and a concentrically arranged metal gas shield that is electrically insulated from the tip, acts as a hood to direct and maintain a coaxial flow of the inert gas in surrounding relation about the wire. The quality of the weld is contingent on both consistent and continuous gas flow and arc patterning. Anything which interferes with the gas flow or redirects or otherwise militates against the desired electrical arc pattern, will diminish the quality of the weld.

MIG welding, when properly executed, permits high welding speeds, and allows for less operator training than is required in the case of other welding techniques. In applications where one or the other or both of these benefits are sought, the weld quality is especially sensitive to those variations which are attributable to adverse gas flow or arc patterning influences.

Gas flow in MIG welding can be adversely effected as a consequence of molten metal deposition. This arises as a result of backsplash splatter on the respective mutually opposed surfaces of the tip and the hood, within the interior of the torch.

Similarly, (since the dielectric strength of the gas flow is otherwise a constant), the accumulation of such backsplash splatter decreases the physical and hence "electrical" distance between the charged tip and the electrically insulated hood. If the distance decreases sufficiently, the voltage differential will exceed the dielectric strength of the intervening gas flow, and the arc will jump between the tip and the hood. This results in a diminished amount of electrical energy being delivered to the weld site and a concomitant compromise in weld quality.

In view of the foregoing, it is important that MIG welding torches be cleaned regularly, in order to avoid these two latter mentioned problems. This realization has led to the development of a number of devices that are intended to perform the necessary operations.

By way of example, one such device, which is intended for use in robotic MIG welding operations, there is provided a heavy gauge wire that is clamped at one end thereof, in upstanding relation, with its uppermost free end available to be received internally of the torch, between the hood (or gas shield) and the tip. The robotic arm is preprogrammed to essay the torch along a predetermined circular path during the cleaning cycle, so that the upstanding wire dislodges splatter material from the two opposed surfaces of the hood and the tip. This approach to the problem can result in the tip being bent out of concentric alignment within the hood, which will in turn result in the very problems that the cleaning cycle is intended to help avert.

Two other such devices each employ a two-part clamping chuck, having a fixed jaw and a movable jaw. Such arrangements do not compensate for differences or vacations in torch nozzle sizes, or off-centred torch insertion, and can result in significant torch nozzle damage.

These clamps are intended to secure the torch in a rigidly-held and centred position, relative to an axially aligned rotating platform. This platform supports one end of each of a number of rotatable, longitudinally extending, substantially elongated blades which are aligned in such a way as to extend in free standing relation within the space between the hood and the tip, and upon rotation to dislodge the splatter from the two surfaces. In both such devices the design of the clamping chuck with its stationary jaw and the use of the substantially elongated blades, can still result in the tip being bent out of alignment relative to the hood, with the seriously adverse consequences already alluded to herein before.

As a consequence of the forgoing, there remains a need in the art for devices that are adapted to minimize the risk of misaligning the tip, while at the same time effectively removing the splatter from within the MIG torch.

SUMMARY OF THE INVENTION

In accordance with one aspect of the improvements of the present invention, there is provided a MIG welding torch reconditioning apparatus comprising chuck means adapted to receive a MIG torch in releasably clamped relation between ones of a plurality of selectively moveable cooperative jaws arranged on respective clamping means.

These jaws are arranged in radially spaced relation around a central axis along which extends, in generally concentric relation, along a longitudinal path for the insertion of the torch. The clamping means are collectively movable in concert to translationally reposition the jaws in, at any given time, one of:
1) a clamping position in which the jaws are clampingly extended into interfering relation at least partially across the path; and,
2) a retracted position wherein the jaws are positioned out of clamping relation, clear of the path, at least in so far as inserting or removing the torch is concerned; and,
3) intermediate positions there between.

Preferably the jaws are arranged as an at least one pair of jaws adapted to travel in mutually radial convergent relation towards the common axis. In a more particularly preferred embodiment, there are at least three channels, together with corresponding jaws, also adapted to move along mutually radially convergent paths generally centred on the aforementioned axis. Jaws within the contemplation of the present invention include, by way of example only, such mechanisms as irises, eccentrically mounted cams, or simply linearly extending elongated bars.

In an especially preferred form of the improvements according to the present invention, the clamping means includes a superposed pair of adjacent support plates that are mutually relatively rotatable about a common axis. Each such plate has edges radially outwardly spaced from the common axis, which define a torch-accommodating opening extending contiguously through each of the plates.

The first such support plate has a plurality of radially extending channels communicating with the above described opening which channels extend radially outwardly from the common axis.

The second support plate has a corresponding plurality of guide slots extending transversely across respective ones of the channels.

The clamping means in this last above mentioned embodiment extend between and are slidably movable in guided relation along respective ones of the channels and the adjacent slots. In this way the clamping means are adapted to take up selected positions at coordinates determined by the relative positions of the channels and the slots.

Accordingly, the relative rotation of the two plates and the concomitant changes in the relative positioning of the corresponding channels and slots, results in the clamping means being translationally repositioned between: a clamping position in which jaws on the clamping means are clampingly extended from the channels into interfering relation in the opening; and, a retracted position wherein the jaws are positioned out of clamping relation, with the clamping means arranged in at least partially retracted relation within the channels; as well as the various intermediate positions in between the two extremes.

The present invention also makes provision for improvements relating to torch reconditioning means that is suitably arranged in axial register along the common axis and is selectively movable relative to the chuck means along a longitudinal extent of that axis. In this way the torch recondiitioning means is selectively removably positionable within the torch's interior, while the torch is securely held in clamped relation within the chuck means. In general, the torch reconditioning means is operable, when so disposed, to remove at least some of any backsplash deposits that may have been laid down on interior torch surfaces in the normal course of a torch's use.

Preferably the torch reconditioning means comprises a rotary reaming tool head having mean for dislocating backsplash accumulated on interior surfaces within the torch. One example of such a reaming tool head has a cylindrical body with a hollow longitudinal bore therein extending interiorly from an opening at a free first end of the body to an intersection between the longitudinal bore and a transverse bore communicating with at least one other opening through an exterior surface of the body.

The longitudinal bore is diametrically dimensioned to receive a torch tip in supporting relation therewith. In this way the torch tip is secured therein against possible extreme lateral bending moments.

The means on the torch reconditioning means for dislocating backsplash preferably comprises a plurality of longitudinally extending spiral, (including spiral) reaming blades arranged on the exterior surface of the body of the tool head. These blades extend to a distance radially outwardly beyond the cylindrical body to engage in closely interfitting relation within the interior diameter of the torch gas shield. They also extend longitudinally beyond the free first end of the body and taper radially inwardly about that end to terminate adjacent the periphery of the opening through the free first end. It is especially technically desirable, (although intrinsically more expensive), to have these blades extend radially into a slightly axially interfering relation across the longitudinal bore, overhanging the opening in the free first end. In such an arrangement dislocated backsplash materials are permitted to readily pass downwardly along the longitudinal bore from which they are expelled through said transverse bore by centrifugal/centripetal forces arising during operational rotation of the tool head.

DETAILED DESCRIPTION OF A PREFERRED EMBODIMENT

Introduction to the Drawings

FIGS. 2 and 3 are plan views of a preferred chuck means, illustrating various components thereof arranged in a clamping orientation as shown in FIG. 2, and an unclamped orientation as shown in FIG. 3;

Figure 1:
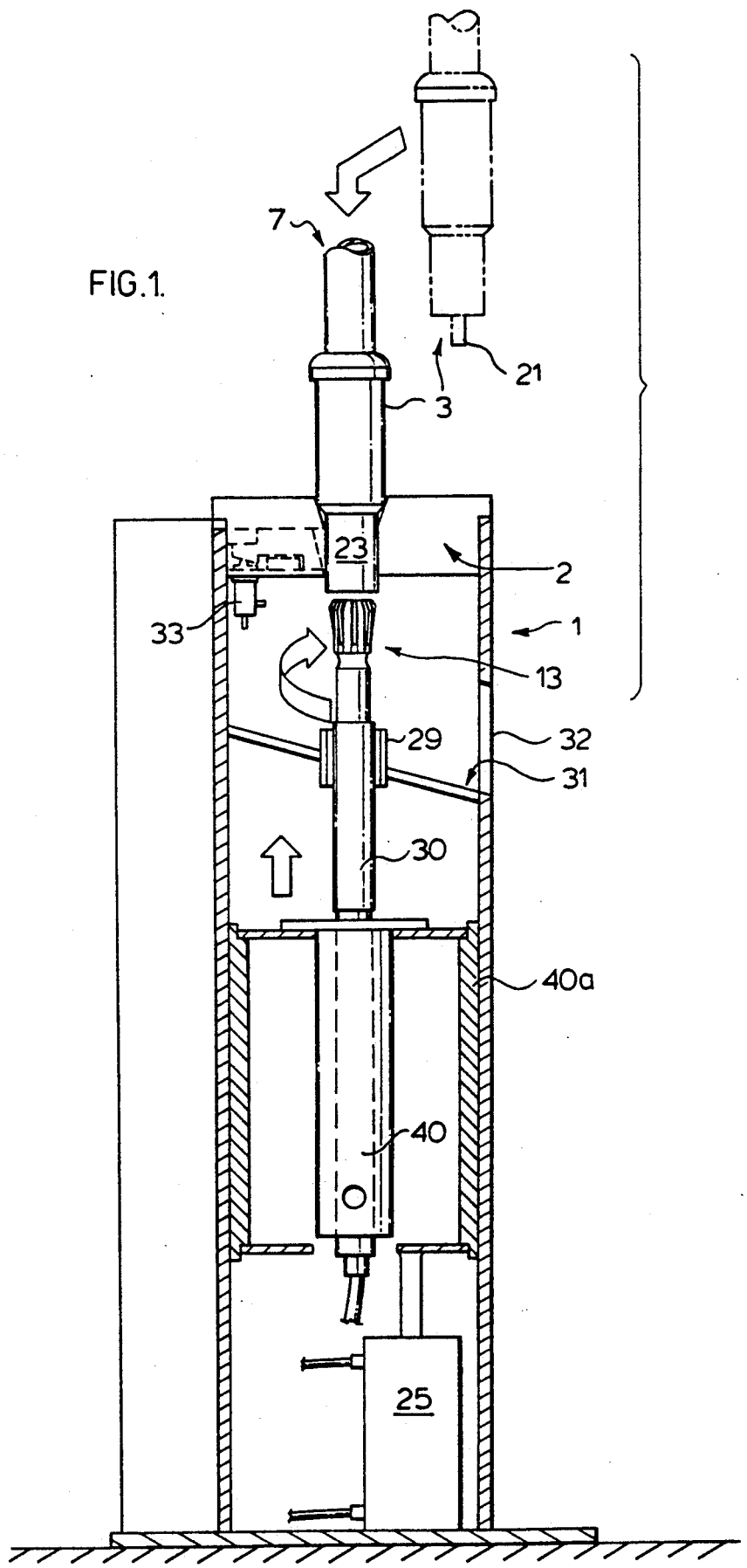
FIG. 1 is a raised elevational side view, in cross section, depicting a presently preferred embodiment of the present invention.

Referring to the drawings in general, for the time being, and in accordance with a preferred aspect of the present invention, there is provided a MIG welding torch reconditioning apparatus comprising a housing 1. Housing 1 encloses, inter alia, chuck means 2 which is adapted to receive torch 3 in releasably clamped relation between ones of a plurality of selectively moveable, cooperative jaws 4. Jaws 4 are arranged on respective clamping means 5, in radially spaced relation around a central axis 6. Central axis 6 lays along a longitudinal path 7 of insertion for said torch 3. Clamping means 5 are movable in concert to translationally reposition respective jaws 4 between: the aforementioned clamping position, in which jaws 4 are clampingly extended into transverse interfering relation into path 7; and, a retracted position wherein jaws 4 are positioned out of clamping relation, and clear of path 7.

The chuck means 2 comprises a superposed pair of adjacent support plates 8a, 8b. These are mutually relatively rotatable about common axis 6, and each plate has edges, 9a and 9b, respectively, that are radially outwardly spaced from axis 6 to thereby circumscribe a torch access opening 10 that extends through respective plates 8a and 8b.

Plate 8 is connected to first pneumatic actuator means 24 through rotational limit pin 41, which acts within the limits of rotational limit slot 42 of the other of these plates, to provide for the stated relative rotation there between.

Of the plates in question, plate 8a is the first aforementioned support plate, and as such has a plurality of radially extending channels 11 communicating with opening 10 and extending radially outwardly from common axis 6.

By the same token, plate 8b is the aforementioned second support plate and has a corresponding plurality of guide slots 12 that are arranged in plate 8b so as to extend transversely across respective ones of channels 11 when the two plates 8a and 8b are arranged in the above mentioned superposed relation.

Respective clamping means 5 extend between and are slidably movable in guided relation along the confines of a predetermined path that is circumscribed by the relative positioning of corresponding superposed pairs of channels 11 and said slots 12. In this way clamping means 5 are adapted to be selectively positioned at coordinates defined by the relative positions of the channels 11 and said slots 12, as the two plates 8a and 8b are rotated relative to one another about axis 6, during the operation of the chuck means 2. Accordingly, relative rotation of the plates 8a and 8b and concomitant changes in the relative positioning of said corresponding channels 11 and slots 12, results in the clamping means 5 is translationally repositioned between: a clamping position in which jaws 4 on the clamping means 5 are clampingly extended from the channels 11 into interfering relation in opening 10; and, a retracted position wherein jaws 4 are positioned out of clamping relation, with clamping means 5 arranged in at least partially retracted relation within channels 11.

The three jaws 4 are arranged in mutually, equidistantly spaced relation around common axis 6.

Embodiments having at least three channels, together with their corresponding slots, clamping means and jaws, as illustrated in the drawings appended hereto, are preferred.

In the illustrated embodiment, torch reconditioning means 13 is arranged in axial register with common axis 6 and is selectively axially movable relative to chuck means 2, along a predetermined longitudinal extent of the axis 6. In this way means 13 is selectively removably positionable within the torch's interior 14, when the torch is secured in clamped relation within chuck means 2. Torch reconditioning means 13 is operable therein to remove at least some of any backsplash deposits that are laid down on torch surfaces 14a and 14b thereof over the course of the torch's normal use.

More particularly, torch reconditioning means 13 comprises a rotary reaming tool head 15 having means arranged thereon for dislocating backsplash accumulated on interior surfaces 14a and 14b within said torch. The reaming tool head 15 has a cylindrical body 16 with a hollow longitudinal bore 17 extending interiorly of body 16, from an opening 20 at a free first end 18 thereof. Longitudinal bore 17 extends to an intersection between itself and transverse bore 19, which in turn communicates with at least one opening 21 through an exterior surface 16a of body 16. Longitudinal bore 17 is diametrically dimensioned to receive torch tip 21 in loosely supporting relation therein to thereby provide an effective lateral containment of tip 21 during the torch reconditioning operation. In this way tip 21 is held secured against excessive lateral bending moments. Moreover, longitudinal bore 17 permits dislocated backsplash materials, to, in general, pass downwardly along its length, and from there to be expelled through the transverse bore 19 under the influence of the centrifugal forces that arise during the operational rotation of the tool head 15.

Figure 6:
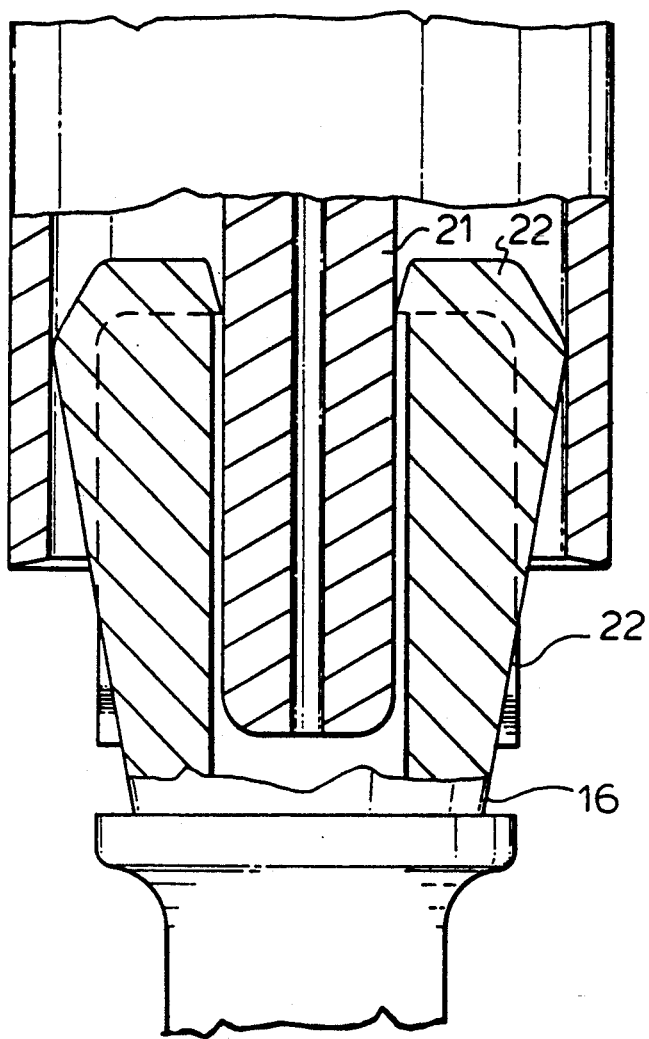
FIG. 6 is an enlarged view of the preferred rotary tool head inserted in the end of a torch.
Figure 7:
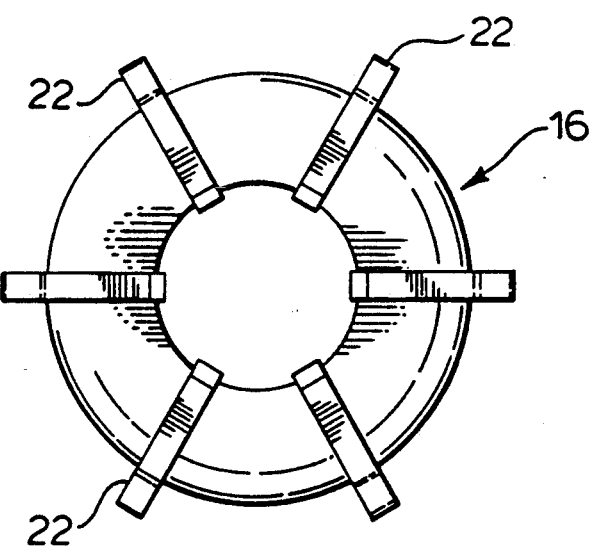
FIG. 7 is an end view of the preferred rotary tool head.

The aforementioned means for dislocating backsplash comprises a plurality of longitudinally extending spiral reaming blades 22 arranged on the exterior surface 16a of the body 16. Blades 22 extend to a distance radially outwardly beyond cylindrical body 16, to engage in closely interfitting relation within the interior diameter of the torch gas shield 23. Blades 22 also extend longitudinally beyond free first end 18 of body 16, and taper radially inwardly about end 18 to terminate adjacent the periphery of opening 20 through free first end 18. More specifically, and in an especially preferred embodiment as is illustrated in FIGS. 6 and 7, blades 22 extend radially into a slightly axially interfering relation along path 7, overhanging opening 20 at the free first end 21. This enhances the removal and handling of backsplash deposits from torch tip 21.

The presently preferred embodiment further includes pneumatic drive means 33 drivingly connected through drive shaft 30, to the rotary reaming tool head 15. In addition, there is provided a first pneumatic actuator means 24 for selectively positioning jaws 4 in and between the above described first and second positions. Also, there is a second pneumatic actuator means 25 for selectively axially positioning the rotary reaming tool head 15.

Control means 26 is responsive, (by way of collar switch 33, thereof), to the insertion of a torch through an opening 27 in the top of housing 1 that is positioned in axial register with opening 10 in chuck 2. Control mean 26 is adapted to sequentially operate second and first actuator mean 25 and 24, and then drive means 40.

It is contemplated that control means 26 can advantageously include positive feed back means for communicating reconditioning cycle completion status control information to a robotic control system when the present invention is utilized in combination with such a robotic welding installation.

Housing 1 contains and/or supports the elements hereinbefore described. Additionally, housing 1 includes a septum plate 28 arranged internally thereof, and divides the interior intermediately at a point between drive means 40 and rotary tool head 15. A sealed opening means 29, that is centrally arranged in septum plate 28, provides for interconnecting drive shaft 30 of the drive means 40 to extend there through in driving relation with rotary tool head 15. In addition to thereby preventing debris from falling into any underlying portions of the apparatus, septum 28 also is arranged to provide a transverse slide surface 31 for directing the debris towards a discharge port 32, that opens exteriorly of housing 1.

Referring now to FIG. 1 in particular, the manner of the torch's insertion along path 7 and into engagement with chuck means 2, is illustrated. Once properly positioned, collar switch 33 operatively effects the clampingly engagement thereof within chuck means 2, and torch 3 is securely oriented to receive tool reconditioning means 13. Note that the activation of collar switch 33 also operates pneumatic drive means 40, which rotates drive shaft 30, and tool reconditioning means 13. Moreover, second pneumatic actuator means 25 is also thereby activated, and acts to propel drive means 40, on axially slidable drive means support frame 40a upwardly within the interior of housing 1. Drive shaft 30 is likewise slidably arranged in sealed opening means 29, and tool reconditioning means 13, is delivered into engaged relation with torch 3 in this manner.

In FIGS. 2 and 3 of the drawings, the operation of a chuck means 2 is illustrated. The extent of the relative rotation of plates 8a and 8b is constrained within the limits defined by the travel of rotational limit pin 41, connected to actuator means 24, within rotational limit slot 42. Plate 8b, is relatively rotated between the two positions illustrated in respective ones of FIGS. 2 and 3, by first pneumatic actuator 24, (not shown in these Figures). A linkage portion of collar switch 33 is shown in FIG. 3, extending into opening 10. The tapered end of this linkage is adapted to be contacted by the end of torch 3, upon insertion thereof into the present apparatus, thereby initiating the reconditioning cycle, described elsewhere herein.

Figure 4:
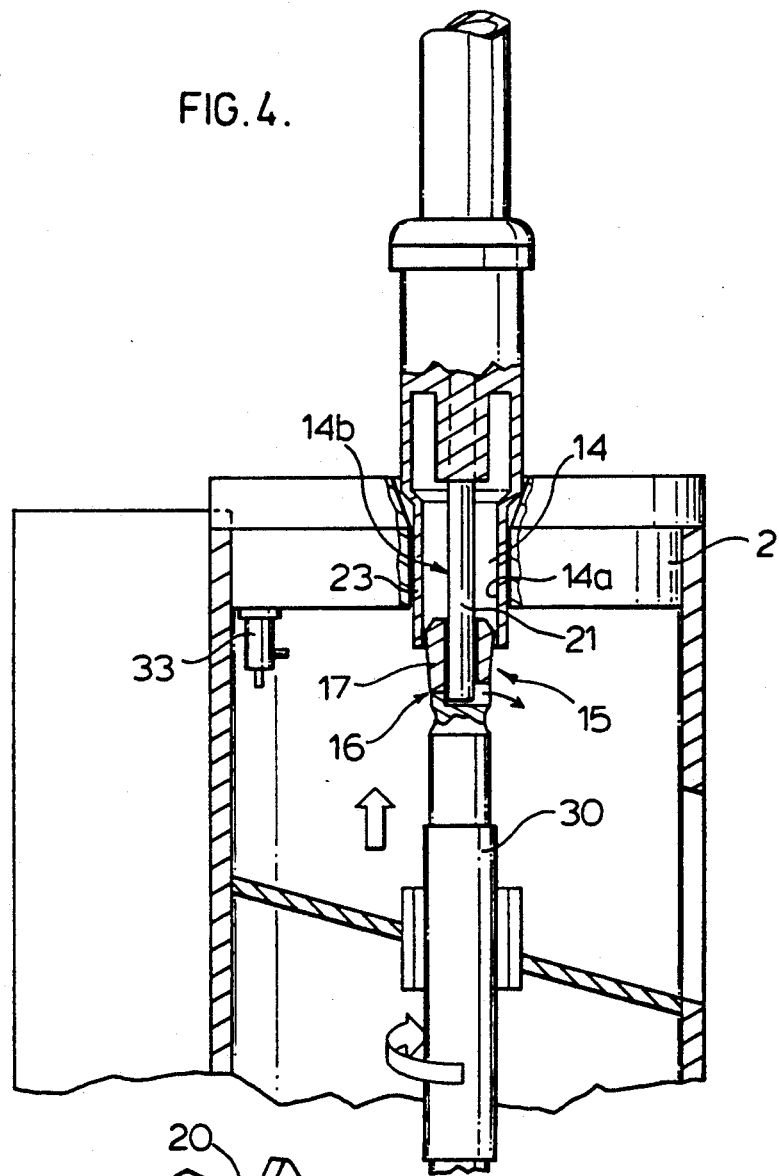
FIG. 4 is a raised elevational side view of an upper portion of the above mentioned preferred embodiment, shown with a torch inserted therein.

FIG. 4 of the drawings shows in greater detail, the interaction of the tool head 15 within the interior 14 of the torch 3, particularly in relation to interior surfaces 14a and 14b.

Figure 5:
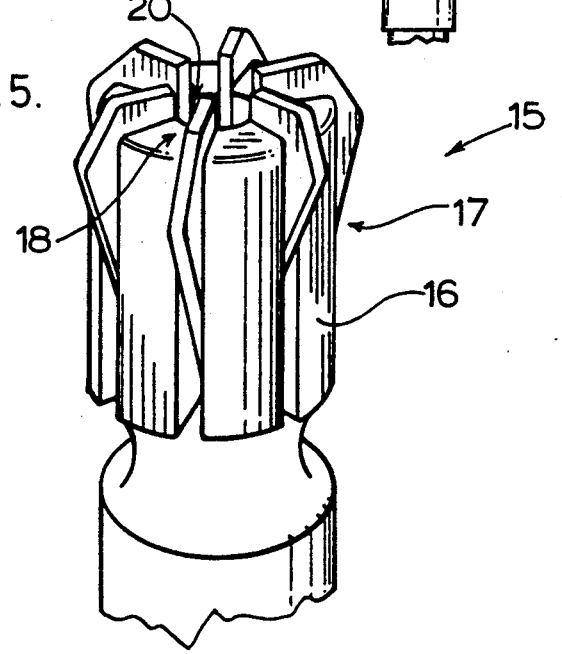
FIG. 5 is an enlarged view of a rotary tool head.

FIGS. 5, 6 and 7 depict in detail, the features of a preferred rotary tool head 15.

Figure 8:
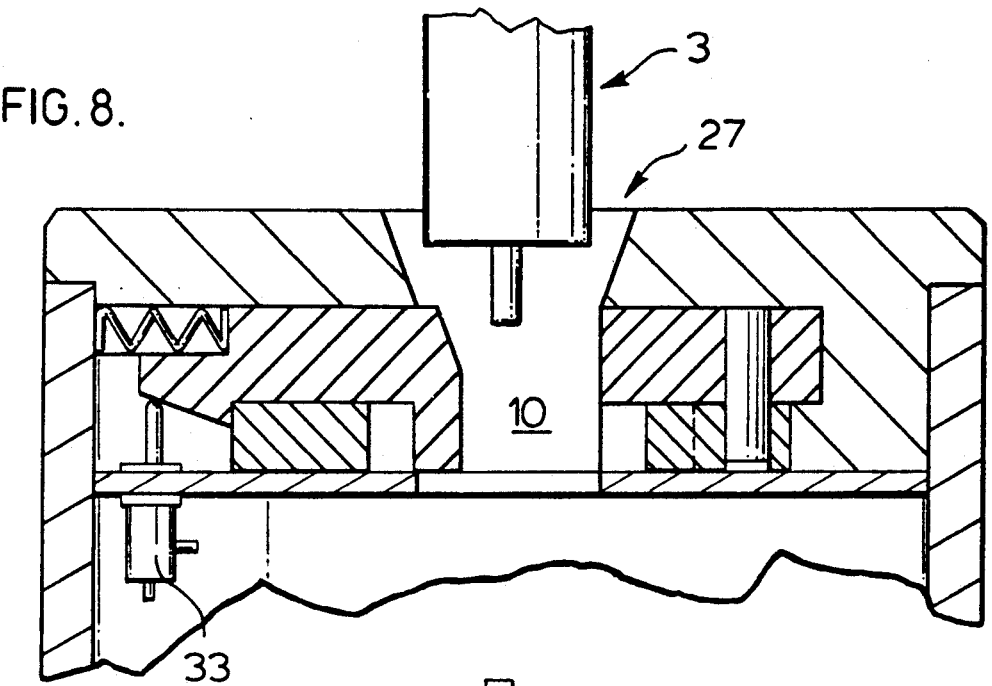
FIGS. 8 and 9 depict the operation of the a collar switch arrangement used to activate the torch reconditioning cycle in the preferred embodiment of the present invention.
Figure 9:
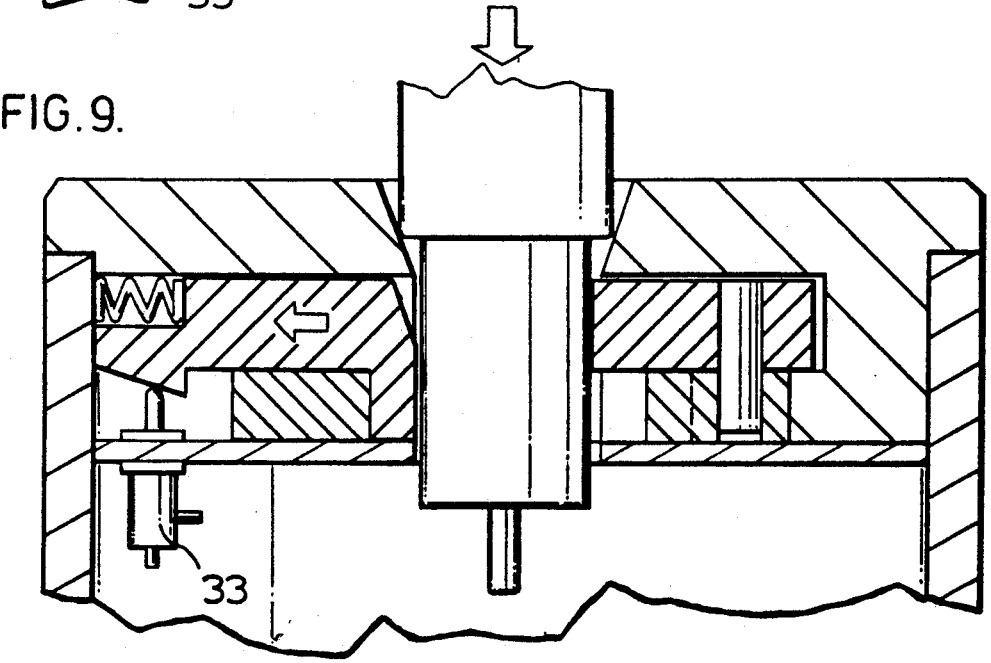

FIGS. 8 and 9 illustrate in detail the operation of collar switch 33 and its associated linkage arm, on insertion of torch 3 through opening 27. Note that the tapered opening 27 serves to provide for some initial, and gross alignment of the torch during its initial stages of its entry into the depicted apparatus. A more refined alignment is achieved by the interaction of jaws 4, after chuck means 2 is activated and brings the jaws to bear against the exterior walls of gas shield 23.

Figure 10:
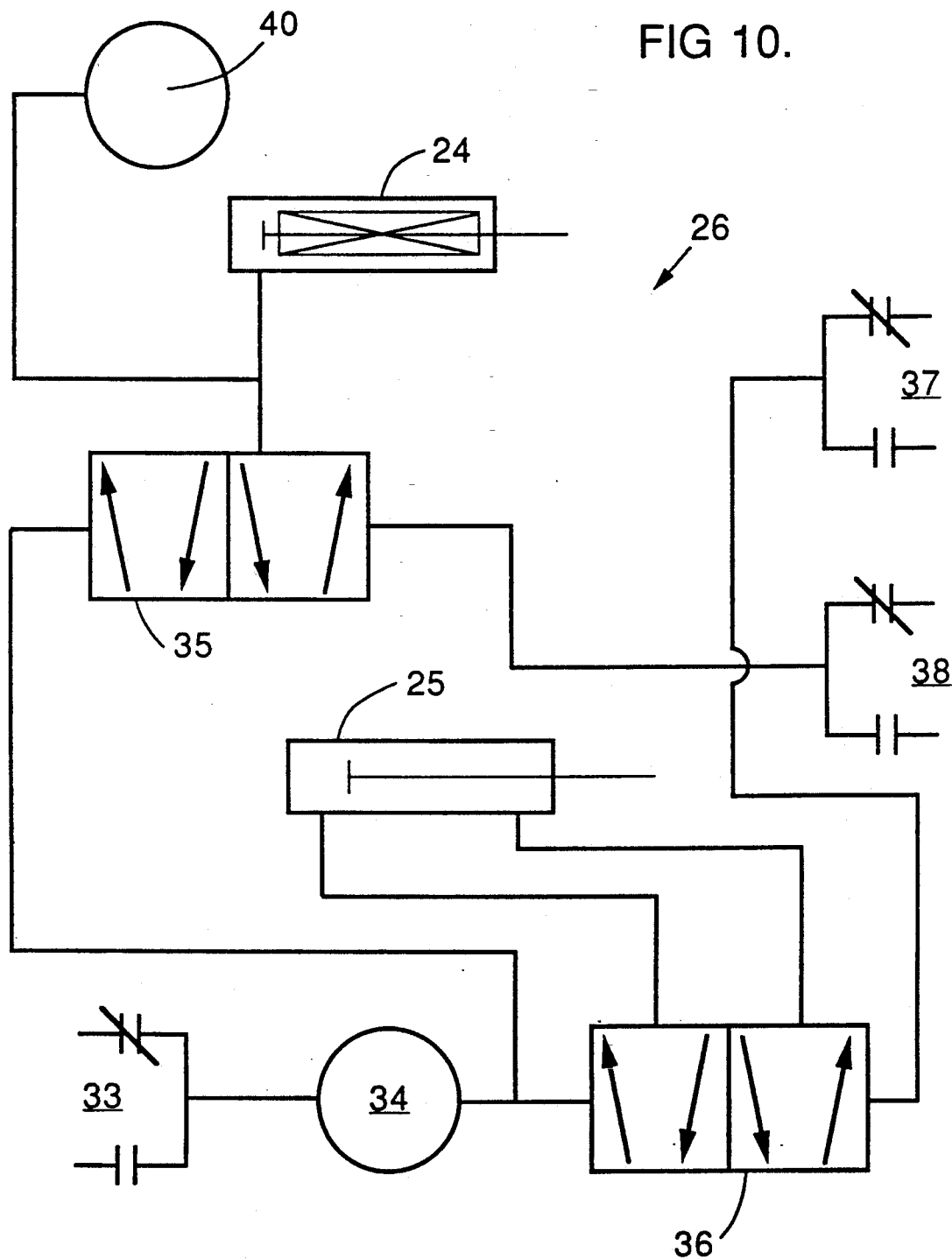
FIG. 10 is a simplified operational schematic associated with the operation of the control means preferably employed in conjunction with the present invention.

Referring now to FIG. 10 of the drawings, the simplified flow chart serves to illustrate the operation of the present apparatus. Activation of collar switch 33 results in the delivery of a pneumatic pulse, from a pulse valve 34 to first and second pneumatic valves 35 and 36 respectively. The first four way valve 35 activates drive means (i.e. a pneumatic motor in the depicted embodiment) 33 which causes the rotary tool head 15 to begin rotating, in the manner already described. In addition, pulse valve 35 activates first pneumatic actuator 24 which engages a torch 3 in clamped relation with chuck means 2, also as hereinbefore described. In concert therewith, pulse valve 36 activates second pneumatic actuator means 25, which motivates the axial travel of the drive means 40 on support frame 40a. The axial travel continues upwardly, delivering the rotating tool head 15 into the torch interior 14, thereby dislodging backsplatter from the interior surfaces 14a and 14b. This process continues until the axial travel takes the tool head 15 to a predetermined position within interior 14. At this point axial travel limit switches 37 and 38 come into play, in their respective turns. Firstly, upper axial travel limit switch responds to the predetermined limit of the tool head 15 insertion into interior 14, by shunting four way valve 36, and thereby reversing the direction of axial travel of second pneumatic actuator means 25. This results in the withdrawal of the rotating tool head 15 from the interior 14, and the return of the support frame 40a into its lowermost rest position. When that last mentioned position is reached, lower limit switch 38 is activated, and shunts the operation of four way valve 35, which in turn shuts down the operation of drive means 33 and moves chuck means 2 into an unclamped orientation, whereupon the freshly reconditioned torch can be removed from the present apparatus and pressed into continued welding service. It is presently estimated that such a reconditioning cycle will be advantageously repeated after every few welding stroke cycles.

Figure 11:
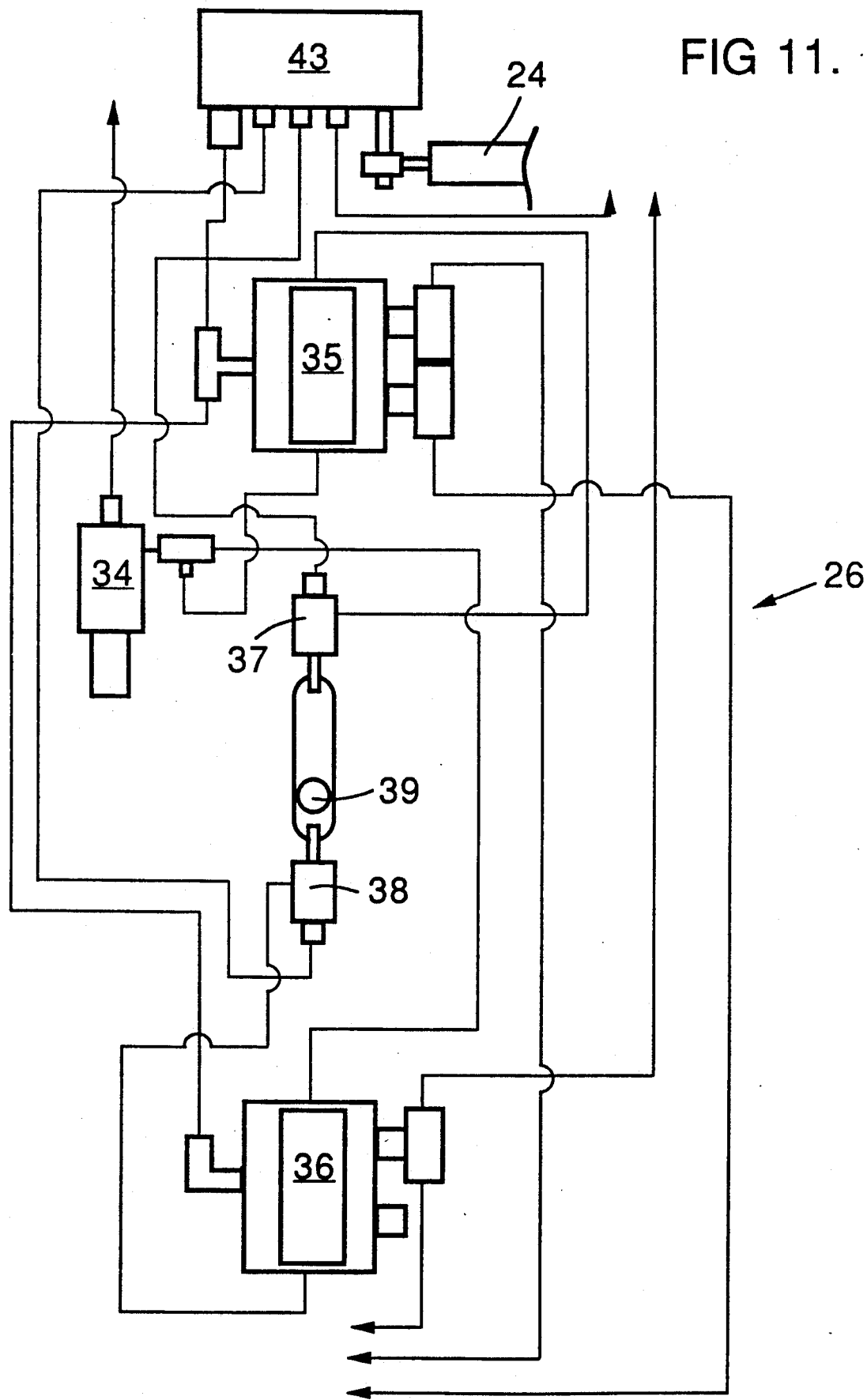
FIG. 11 is a more detailed operational flow chart depicting the relationship between the various operating components of the presently preferred control means; and, FIG. 12 is a perspective view of the housing, and surface mounted features of the present invention.

FIG. 11 of the drawings depicts the relationship between the physical elements corresponding to functional representations depicted in FIG. 10 of the drawings. Note that actuator means 24 is bridgingly interconnected between pneumatic manifold/anchor 43, and limit pin 41, although the latter is not depicted in this particular FIG.

Figure 12:
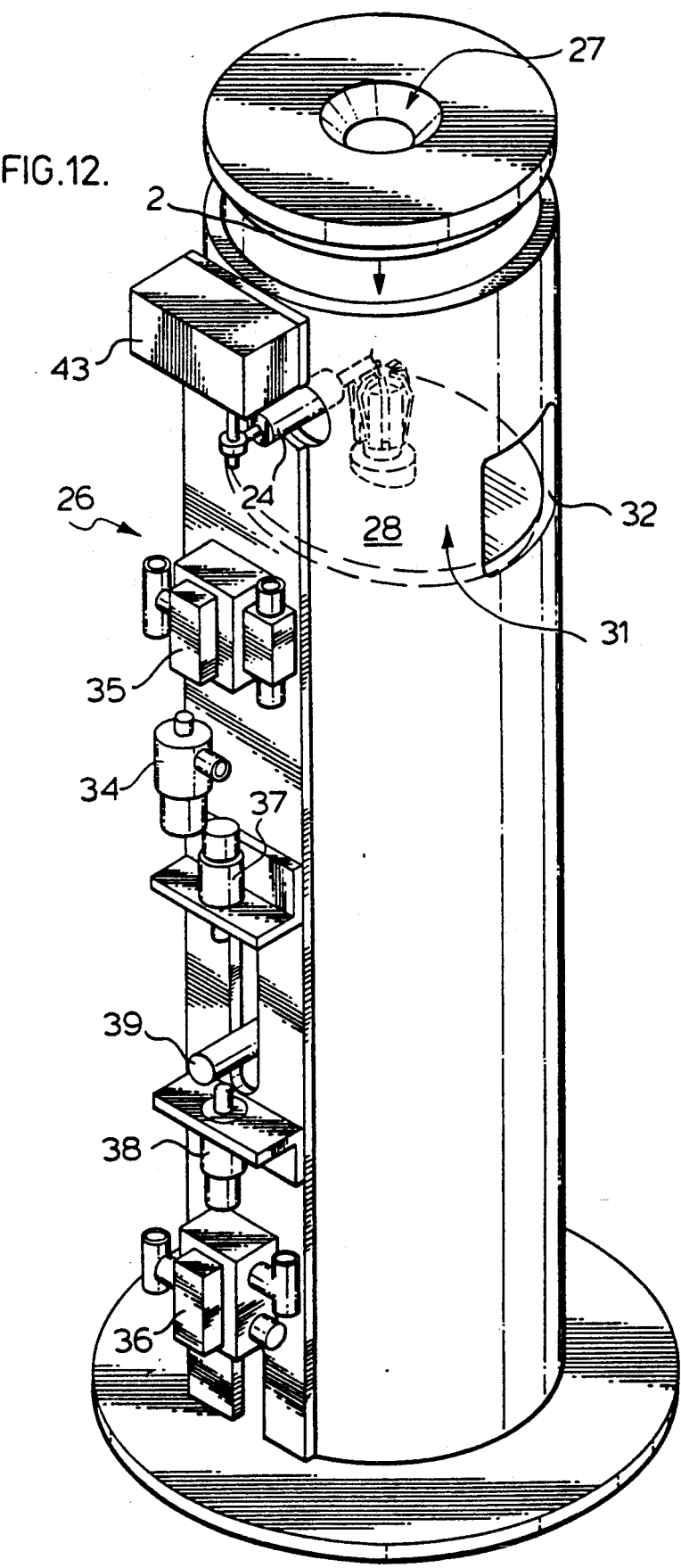

FIG. 12 of the drawings depicts the exterior of housing 1 with the various elements shown in FIG. 11 arranged thereon.

We claim:

1. A MIG welding torch reconditioning apparatus comprising:
   chuck means adapted to receive said torch in releasably clamped relation between ones of a plurality of selectively moveable cooperative jaws of respective clamping means, with aid jaws arranged in radically spaced relation around a central axis defining a longitudinal path of insertion for said torch, said clamping means being movable in concert to translationally reposition said jaws between: a clamping position in which said jaws are clampingly extended into interfering relation in said path; and, a retracted position wherein said jaws are positioned out of clamping relation, and clear of said path; and, intermediate positions there between; and,
   torch reconditioning means arranged in axial register with said common axis and being selectively movable relative to said chuck means along a longitudinal extent of said axis, and to be thereby selectively removably positionable within said torch's interior, when same is secured in clamped relation within said chuck means, and operable therein to remove at least some of any backsplash deposits laid down on torch surfaces thereof over the course of said torch's preceding use.

2. The apparatus according to claim 1 wherein said jaws are arranged as an at least one pair of jaws adapted to travel in mutually radially convergent relation towards said common axis.

3. A MIG welding torch reconditioning apparatus comprising:
   chuck means adapted to receive said torch in releasably clamped relation, and including a superposed pair of adjacent support plates that are mutually relatively rotatable about a common axis, each plate having edges radially outwardly spaced from said axis to thereby define an opening extending contiguously through said plates, said plates comprising:
      a first support plate with a plurality of radially extending channels communicating with said opening and extending radially outwardly from said common axis; and,
      a second support plate having a corresponding plurality of guide slots extending transversely across respective ones of said channels;
   clamping means extending between and slidably movable in guided relation along said channels and said slots and adapted to be selectively positioned at coordinates defined by the relative positions of said channels and said slots,
   wherein upon relative rotation of said plates and concomitant changes in said relative positioning of said corresponding channels and slots, said clamping means is translationally repositioned between: a clamping position in which jaws on said clamping means are clampingly extended from said channels into interfering relation in said opening; and, a retracted position wherein said jaws are positioned out of clamping relation, with said clamping means arranged in at least partially retracted relation within said channels; and, intermediate positions there between; and,
   torch reconditioning means arranged in axial register with said common axis and being selectively movable relative to said chuck means along a longitudinal extent of said axis, and adapted to be thereby selectively removably positionable within said torch's interior, when same is secured in clamped relation within said chuck means, and operable therein to remove at least some of any backsplash depositees laid down on torch surfaces thereof over the course of said torch's preceding use.

4. The apparatus according to claim 3 wherein said jaws are arranged as an at least one pair of jaws adapted to travel in mutually radially convergent relation towards said common axis.

5. The apparatus according to claim 4 wherein there is provided at least three jaws and said plurality of channels comprises at least three corresponding channels.

6. A MIG welding torch reconditioning apparatus comprising a house enclosing:
   chuck means adapted to receive said torch in releasably clamped relation between ones of a plurality of selectively moveable cooperative jaws of respective clamping means, with said jaws arranged in radially spaced relation around a central axis defining a longitudinal path of insertion for said torch, said clamping means being movable in concert to translationally reposition said jaws between: a clamping position in which said jaws are clampingly extended into interfering relation in said path; and, a retracted position wherein said jaws are positioned out of clamping relation, and clear of said path; and, intermediate positions there between; and,
   torch reconditioning means arranged in axial register with said common axis and being selectively axially movable relative to said chuck means along a longitudinal extent of said axis, and thereby selectively removably positionable within said torch's interior, when same is secured in damped relation within said chuck means, said torch reconditioning means being operable therein to remove at least some of any backsplash deposits laid down on torch surfaces thereof over the course of said torch's preceding use; said torch reconditioning means comprising:
      a rotary reaming tool head having means for dislocating backsplash accumulated on interior surfaces within said torch;
      said reaming tool head having a cylindrical body with a hollow longitudinal bore therein extending interiorly from an opening at a free first end of said body to an intersection between said longitudinal bore and a transverse bore communicating with at least one opening through an exterior surface of said body;

wherein said longitudinal bore is diametrically dimensioned to receive a torch tip in supporting relation therewith to thereby secure said tip therein against lateral bending moments, and whereby dislocated backsplash materials are permitted to pass downwardly along said longitudinal bore from which they are expelled through said transverse bore by centrifugal/centripetal forces arising during operational rotation of said tool head; and, drive means drivingly connected to said rotary reaming tool head; and, first pneumatic actuator means for selectively positioning said jaws in and between said first and second positions; and, second pneumatic actuator means for selectively axially positioning said rotary reaming tool head; and, control means responsive to the insertion of a torch through an opening in said housing that is positioned in axial register with said opening in said chuck, said control means being adapted to sequentially operate first and second actuator means and said drive means.

7. The apparatus according to claim 6 further including positive feed back means for communicating reconditioning cycle completion status to a robotic control system controlling the positioning and operation of said torch.

8. The apparatus according to claim 7 wherein said housing includes a septum plate arranged internally of said housing and dividing the interior thereof intermediately between said drive means and said rotary tool head, with sealed opening means in said septum plate providing for an interconnecting drive shaft of said drive means to extend there through in driving relation with said rotary tool head, said septum being arranged to provide a transverse slide surface for collecting debris removed from said torch by said apparatus and to direct said debris towards a discharge port opening exteriorly of said housing.

9. The apparatus according to claim 6 wherein said jaws are arranged as an at least one pair of jaws adapted to travel in mutually convergent relation towards said common axis.

10. The apparatus according to claim 9 wherein there is provided at least three jaws and said plurality of channels comprises at least three corresponding channels.

11. The apparatus according to claim 6 wherein said chuck means comprises a superposed pair of adjacent support plates that are mutually relatively rotatable about a common axis, each plate having edges radially outwardly spaced from said axis to thereby define an opening extending contiguously through said plates, said plates comprising:

a first support plate with a plurality of radially extending channels communicating with said opening and extending radially outwardly from said common axis; and, a second support plate having a corresponding plurality of guide slots extending transversely across respective ones of said channels;

clamping means extending between and slidable movable in guided relation along said channels and said slots and adapted to be selectively positioned at coordinates defined by the relative positions of said channels and said slots, wherein upon relative rotation of said plates and concomitant changes in said relative positioning of said corresponding channels and slots, said clamping means is translationally repositioned between: a clamping position in which jaws on said clamping means are clampingly extended from said channels into interfering relation in said opening; and, a retracted position wherein said jaws are positioned out of clamping relation, with said clamping means arranged in at least partially retracted relation within said channels; and, intermediate positions there between.

12. The apparatus according to claim 11 wherein said jaws are arranged as pairs of jaws arranged as an at least one pair of jaws adapted to travel in mutually radially convergent relation toward said common axis.

13. The apparatus according to claim 12 wherein there is provided at least three jaws and said plurality of channels comprises at least three corresponding channels.

14. The apparatus according to claim 6 wherein said means for dislocating backsplash comprises a plurality of longitudinally extending spiral reaming blades arranged on the exterior surface of said body, said blades extending to a distance radially outwardly beyond said cylindrical body to engage in closely interfitting relation within the interior diameter of the torch gas shield, and extending longitudinally beyond said free first end of said body and tapering radially inwardly about that end into to terminate adjacent the periphery of said opening through said free first end.

15. The apparatus according to claim 14 wherein said blades extend radially into a slightly axially interfering relation overhanging said opening in said free first end.

* * * * *